(12) United States Patent
Aranda Vazquez et al.

(10) Patent No.: US 9,883,553 B2
(45) Date of Patent: Jan. 30, 2018

(54) HOB APPARATUS

(71) Applicant: BSH Hausgeräte GmbH, Munich (DE)

(72) Inventors: Sandra Aranda Vazquez, Saragossa (ES); Beatriz Arenas Jimenez, La Muela (ES); Jesús Ceamanos Gaya, Saragossa (ES); Cristina Diez Esteban, Saragossa (ES); Carlos Lacasta Beltran, Saragossa (ES); Damaso Martin Gomez, Saragossa (ES); Maria Elena Moya Albertin, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 0 days.

(21) Appl. No.: 15/022,934

(22) PCT Filed: Sep. 9, 2014

(86) PCT No.: PCT/IB2014/064337
§ 371 (c)(1),
(2) Date: Mar. 18, 2016

(87) PCT Pub. No.: WO2015/049602
PCT Pub. Date: Apr. 9, 2015

(65) Prior Publication Data
US 2016/0234889 A1    Aug. 11, 2016

(30) Foreign Application Priority Data

Oct. 3, 2013 (ES) .................................. 201331457

(51) Int. Cl.
*H05B 6/12* (2006.01)
*H05B 6/36* (2006.01)
(Continued)

(52) U.S. Cl.
CPC ........... *H05B 6/1209* (2013.01); *F24C 7/002* (2013.01); *F24C 7/06* (2013.01); *F24C 7/062* (2013.01);
(Continued)

(58) Field of Classification Search
CPC .. F24C 7/06; F24C 7/002; F24C 7/062; F24C 15/101; F24C 15/102; H05B 6/1209;
(Continued)

(56) References Cited

U.S. PATENT DOCUMENTS

2009/0294432 A1* 12/2009 Baek ..................... F24C 7/067
219/461.1

FOREIGN PATENT DOCUMENTS

DE     102007032762 A1    2/2008
EP         1335632 A2 *   8/2003 ............ F24C 15/102
(Continued)

OTHER PUBLICATIONS

National Search Report ES 201331457 dated May 22, 2014.
International Search Report PCT/IB2014/064337 dated Nov. 27, 2014.

*Primary Examiner* — Hung D Nguyen
(74) *Attorney, Agent, or Firm* — Michael E. Tschupp; Andre Pallapies; Brandon G. Braun (57) ABSTRACT

A hob apparatus includes at least one heating element adapted to heat a cooking vessel. The at least one heating element is supported by at least one space dividing element in an installation position. A fixing unit embodied at least in part as a locking unit attaches the at least one heating element and the at least one space dividing element to each other.

25 Claims, 6 Drawing Sheets (51) Int. Cl.
*F24C 7/06* (2006.01)
*F24C 15/10* (2006.01)
*F24C 7/00* (2006.01)

(52) U.S. Cl.
CPC ......... *F24C 15/102* (2013.01); *H05B 6/1245* (2013.01); *H05B 2206/022* (2013.01); *H05B 2213/03* (2013.01); *Y02B 40/126* (2013.01)

(58) Field of Classification Search
CPC .. H05B 6/1245; H05B 6/1254; H05B 6/1263; H05B 6/1272; H05B 6/1281; H05B 6/36; H05B 2206/022; H05B 2213/03; Y02B 40/126
USPC ...... 219/460.1, 461.1, 463.1, 620, 621, 622, 219/624, 675, 676, 623, 465.1, 467.1
See application file for complete search history.

(56) References Cited

FOREIGN PATENT DOCUMENTS

| | | |
|---|---|---|
| ES | 2322978 A1 | 7/2009 |
| ES | 2331446 A1 | 12/2009 |
| ES | 2432418 A2 | 12/2013 |
| WO | 201107732 A1 | 6/2011 |
| WO | 2011138715 A1 | 11/2011 |
| WO | 2012062881 A1 | 5/2012 |

* cited by examiner

HOB APPARATUS

BACHGROUND OF THE INVENTION

The invention is based on a hob apparatus, in particular an induction hob apparatus, according to the the independent claim.

A hob apparatus, and specifically an induction hob apparatus, has already been proposed, with a heating element, which is provided for the heating of cooking vessels, with a space dividing element, which in an installation position is provided to support the heating element, and with a fixing unit, which is provided to attach the heating element and the space dividing element to each other.

It is the object of the invention in particular to provide a generic device with an advantageous design.

BRIEF SUMMARY OF THE INVENTION

It is the object of the invention in particular to provide a generic device with an advantageous design.

The invention is based on a hob apparatus, in particular an induction hob apparatus, with at least one heating element, which is provided for the heating of cooking vessels, with at least one space dividing element, which in an installation position is provided to support the at least one heating element, and with a fixing unit, which is provided to attach the at least one heating element and the at least one space dividing element to each other.

It is proposed that the fixing unit is embodied at least in part as a locking unit. A "heating element" should in particular be taken to mean an element which is provided, at least in an operating mode, to transmit electrical energy at least in large part to a cooking vessel, preferably through at least one base body forming a cooking surface, and/or to convert electrical energy into heat, in order to heat in particular at least one cooking vessel placed in position, preferably through at least one base body forming a cooking surface. The heating element is in particular provided, in at least one operating mode, in which the heating element is connected to a power supply electronics unit, to transmit an output of at least 100 W, in particular at least 500 W, advantageously at least 1000 W and preferably at least 1500 W. The heating element is in particular embodied as an induction heating element. The hob apparatus in particular comprises at least two, in particular at least three, advantageously at least four and particularly advantageously at least six heating elements. "Space dividing element" should in particular be taken to mean an element which is provided, at least in the assembled state, to divide at least one space, in particular at least one storage space, into at least two subsidiary spaces. In particular the space dividing element is additionally provided, in an installation position, to take up at least a majority of a weight force of the at least one heating element and/or retain the at least one heating element in at least one defined position, and in particular to transfer and/or redirect the weight force taken up from at least one heating element to at least one further unit, in particular to at least one housing unit. At least in the assembled state and in an installation position the heating element is in particular at least largely arranged on the space dividing element. The hob apparatus has in particular at least one base body and advantageously additionally at least one housing unit. The housing unit is preferably provided, at least in the assembled state, to embody together with the base body at least one part of an external housing, in particular of a hob external housing. In particular the housing unit and the base body jointly delimit at least one space, in particular a storage space embodied as a cavity for the storage of components, for example the heating element, at least one control unit and/or at least one hob electronics unit. "Fixing unit" should in particular be taken to mean a unit which is provided to attach the heating element and the space dividing element to each other in a form-fitted and/or non-positive manner, which is preferably impossible to release without the use of tools, at least in the assembled state. The fixing unit is in particular provided, at least essentially to prevent, in particular to block at least one movement of the heating element and of the space dividing element relative to each other, at least in a spatial direction, in particular in at least two spatial directions and advantageously in at least three spatial directions. The fixing unit is advantageously provided to lock the heating element and the space dividing element to each other, at least in the assembled state. The fixing unit has in particular at least one fixing element, which is embodied as a locking element. Advantageously, the fixing element is provided to create at least one form-fitted connection between the heating element and the space dividing element, by means of at least one positional change and/or by means of at least one change of form. In particular the fixing element is embodied as an element differentiated from a screw. For example the positional change could be embodied as at least one linear movement. The positional change is preferably embodied as at least one rotational movement, and specifically in particular about an axis which lies outside the fixing element. In particular the fixing element is provided, in the case of an assembly procedure, to be moved from at least one first position to at least one second position, in particular in a displacement-free and/or deformation-free manner. In particular the heating element and the space dividing element are arranged in the first position of the fixing element in the unlocked state. In particular the heating element and the space dividing element are arranged in the second position of the fixing element in the locked state. The statement that the fixing unit is embodied "at least in part" as a locking unit should in particular be taken to mean that in addition to an embodiment as a locking unit, the fixing unit could be embodied as at least one further unit. For example the fixing unit could additionally be embodied as a latching unit, and provided to latch the heating element and the space dividing element to each other and/or to connect them to each other in a form-fitted manner at least in the assembled state. It is likewise conceivable that the fixing unit is additionally embodied as a clamping unit and is provided to connect the heating element and the space dividing element to each other in a non-positive manner and/or by means of at least one clamping connection at least in the assembled state. "Provided" should in particular be taken to mean specially programmed, designed and/or equipped. That an object is provided for a particular function should in particular be taken to mean that the object fulfills and/or performs this function in at least one application and/or operating status.

By means of the inventive embodiment a hob apparatus with an advantageous design can be provided. In particular a short assembly time and/or a high degree of flexibility can be achieved. In particular assembly which is simple and/or rapidly executable and/or can be implemented without the use of tools can be achieved. In particular simple and/or rapid disassembly can be achieved, whereby in particular maintenance effort can be reduced. In particular the fixing unit can be employed for various types of heating elements, by means of which an environmentally friendly and/or cost-effective embodiment can be achieved. Pre-assembly can in particular be avoided. In particular machine-aided and/or automated assembly of the heating element and the space dividing element can be enabled.

It is further proposed that the fixing unit is provided to attach the at least one heating element and the at least one space dividing element to each other by means of a rotational movement of the at least one heating element and of the at least one space dividing element relative to each other. In particular the fixing element is provided to be moved with a rotational movement about at least one axis of rotation, which is at least essentially perpendicularly oriented to at least one surface of the space dividing element and/or of the heating element, by an angle of less than 120°, in particular of less than 90°. The statement that a straight line and/or plane is oriented "at least essentially perpendicularly" to a further straight line and/or plane separately embodied from the one straight line and/or plane, should in particular be taken to mean that the straight line and/or plane with the further straight line and/or plane, in the case of a projection onto at least one projection plane, in which at least one of the straight lines and/or one of the planes is arranged, form an angle which preferably diverges from an angle 90° by less than 15°, advantageously by less than 10° and in particular by less than 5°. A short assembly time and/or rapidly executable assembly and/or disassembly can in particular thereby be achieved.

It is additionally proposed that the rotational movement is limited to an angular range of maximum 30°, in particular of maximum 25°, advantageously of maximum 20°, particularly advantageously of maximum 15°, preferably of maximum 10° and particularly preferably of maximum 7°. In particular the rotational movement is limited to an angular range of at least 2°, in particular of at least 3° and advantageously of at least 4°. The heating element and the space dividing element can in particular thereby be attached to each other in the most restricted space. In particular a flexible and/or space-saving embodiment can be achieved.

It is further proposed that the fixing unit has at least one fixing element, which is arranged, in particular fixed, on the at least one heating element and in the locked state penetrates the at least one space dividing element at least in part. The statement that the fixing element at least in the locked state penetrates the space dividing element "at least in part", should in particular be taken to mean that the fixing element at least in the locked state engages in the space dividing element and/or penetrates the space dividing element. In particular the fixing element penetrates the space dividing element at least in the locked state. A stable and/or durable fixing between the heating element and the space dividing element can in particular be achieved thereby.

It is further proposed that the at least one fixing element is embodied at least essentially in one piece with the at least one heating element. "At least essentially" in one piece should in particular be taken to mean connected to each other in one piece and/or impossible to release without the use of tools. For example the fixing element and the heating element could be connected to each other by means of at least one adhesive bond without the possibility of being released. Alternative connections deemed to be sensible by a person skilled in the art are further conceivable. The fixing element and the heating element are advantageously embodied in one piece. "In one piece" should in particular be taken to mean at least connected in a firmly bonded manner, for example by means of a welding process, an adhesive process, an injection-molding process and/or another process deemed to be sensible by the person skilled in the art, and/or advantageously formed in one piece, such as for example through manufacture in a single casting and/or through manufacture in a single or multiple component spraying method and advantageously from a single blank. A high level of stability can in particular thereby be achieved.

It is additionally proposed that the at least one space dividing element has at least one recess for accommodating the at least one fixing element. In particular the fixing element penetrates the recess of the space dividing element at least in part at least in the locked state. In particular when viewing one projection the recess has in at least one plane a surface extension of less than 10 cm$^2$, in particular of less than 7 cm$^2$, advantageously of less than 5 cm$^2$ and particularly advantageously of less than 3 cm$^2$. A simple and/or rapid assembly can in particular be achieved thereby. In particular an unobtrusive and/or stable embodiment can be achieved. In particular impairment of a function, in particular a shielding function of the space dividing element by the recess, can be prevented.

It is further proposed that the at least one heating element comprises at least one stabilization element, which is provided for stabilization of a fixing between the at least one heating element and the at least one space dividing element. In particular the stabilization element is in particular additionally provided for stabilization of a fixing between the heating element and the space dividing element, for orientation of the heating element and the space dividing element relative to each other. The at least one stabilization element preferably defines an axis of rotation about which the at least one heating element and the at least one space dividing element are mounted in a rotatable manner relative to each other. A high level of stability and/or a short assembly time can thereby in particular be achieved.

It is further proposed that the fixing unit has at least one protection element, which is provided, in the assembled state to secure a target position of the at least one heating element and of the at least one space dividing element relative to each other. In particular the at least one protection element penetrates at least in part into the space dividing element and/or through the space dividing element at least in the locked state. The space dividing element preferably has at least two protection recesses at least for accommodating the protection elements, which are in particular arranged adjacently to each other. The protection recesses preferably have a distance from each other of less than 2 cm, in particular of less than 1 cm, advantageously of less than 0.5 cm and preferably of less than 0.3 cm. The protection element is in particular provided to be moved from at least one first position into at least one second position with a locking movement, wherein in the first position the protection element is in particular arranged in a first of the protection recesses and in the second position in particular in a second of the protection recesses. In particular the protection element is provided, in particular to be elastically deflected and/or deformed with a movement from the first position into the second position.

The protection element is preferably embodied as a latching element. "Target position" of the heating element should in particular be taken to mean a position in which the heating element is to be arranged at least in the locked and/or mounted state, in particular in order to achieve at least essentially alignment between the position of the heating element with markings on the base body forming a cooking surface. An undesirable movement of the heating element and the space dividing element relative to each other in the locked state can in particular thereby be prevented.

It is additionally proposed that the at least one space dividing element is embodied as a shielding element. In particular the space dividing element is provided to shield at least one control unit against electromagnetic radiation, in particular heat radiation and/or magnetic fields caused by at least one heating element. In particular the space dividing element is embodied at least in part from electrically conductive material, in particular from metal, and preferably additionally from a non-magnetic material, advantageously from aluminum, alternatively from copper. Alternatively further materials, deemed to be sensible by a person skilled in the art, are conceivable. A high level of safety and/or a durable embodiment can thereby in particular be achieved. In particular an impairment of a shielding function of the space dividing element brought about as a result of recesses in the space dividing element can be prevented due to a small size of the recess.

Further advantages are evident from the following description of the drawings. Embodiments of the invention are shown in the drawing. The drawing, the description and the claims contain numerous features in combination. The person skilled in the art will expediently also consider the features individually and bring these together in sensible further combinations.

DETAILED DESCRIPTION OF EXEMPLARY EMBODIMENTS OF THE PRESENT INVENTION

Figure 1:
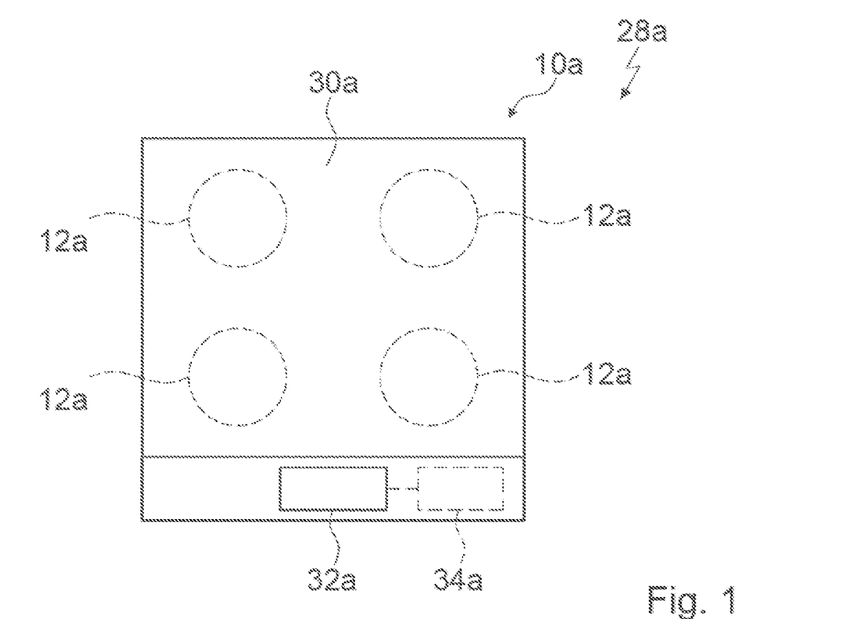
FIG. 1 shows a hob with an inventive hob apparatus in a schematic top view.

FIG. 1 shows a hob 28a, which is embodied as an induction hob, with an inventive hob apparatus 10a, which is embodied as an induction hob apparatus. The hob apparatus 10a has a base body 30a to support cooking vessels. The base body 30a is embodied as a hob plate. The base body 30a forms a cooking surface.

Figure 3:
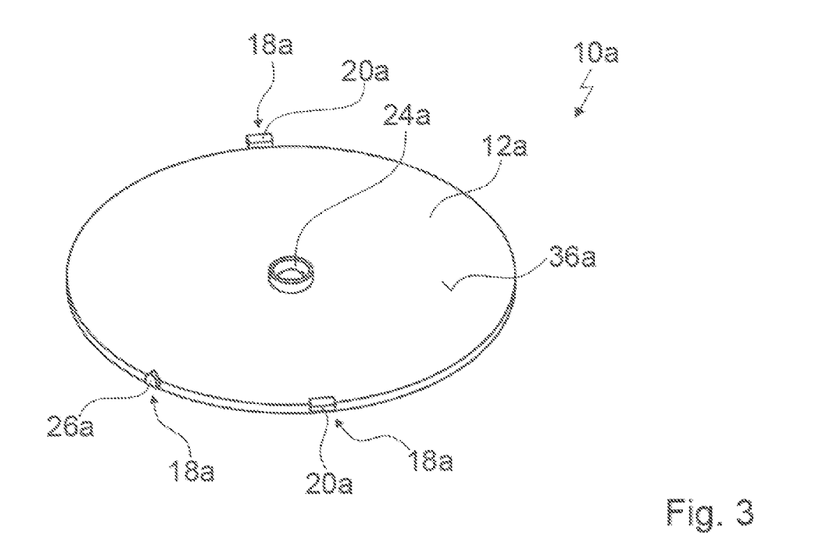
FIG. 3 shows a heating element of the hob apparatus from FIG. 1 from an underside in a schematic representation.

The hob apparatus 10a has an operating unit 32a for the entry and/or selection of operating parameters, for example a heating power and/or a heating power density and/or a heating zone (cf. FIG. 3). The operating unit 32 is provided for the output of a value of an operating parameter to an operator. The hob apparatus 10a has a control unit 34a, which is provided to perform actions and/or to change settings depending on operating parameters entered by means of the operating unit 32a.

The hob apparatus 10 comprises four heating elements 12a, which are provided for the heating of cooking vessels. The heating elements 12a, which are embodied as induction heating elements, are arranged underneath the base body 30a. The heating elements 12a have in each case an essentially circular shape.

Figure 2:
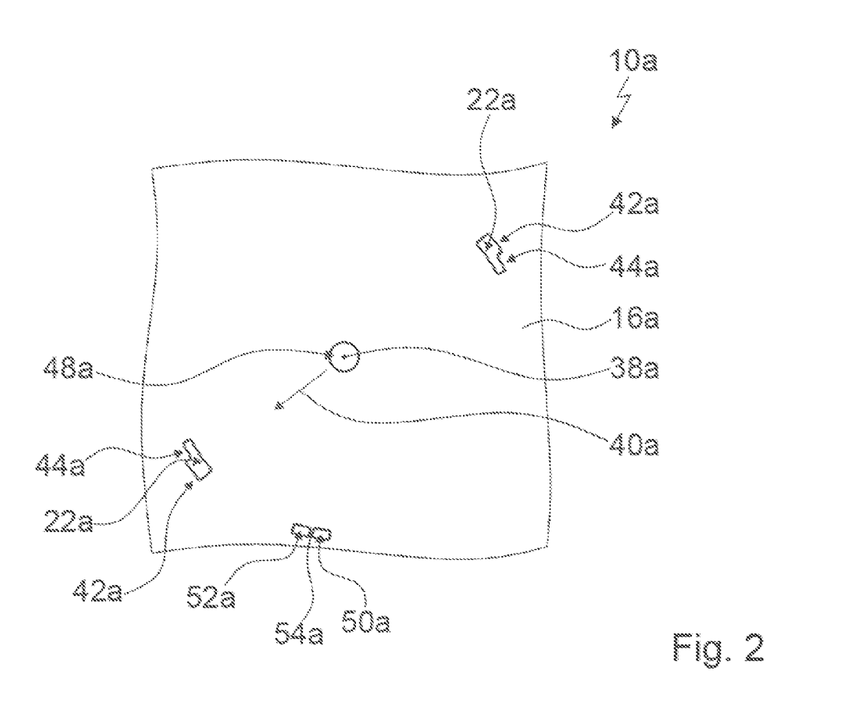
FIG. 2 shows an extract of a space dividing element of the hob apparatus from FIG. 1 in a schematic top view.

The hob apparatus 10a comprises a space dividing element 16a, which in an installation position is provided to support the heating elements 12a (cf. FIG. 2). In a mounted state the space dividing element 16a is oriented parallel to the base body 30a. Each heating element 12a has an underside 36a. In the assembled state the heating elements 12a are arranged with the underside 36a in direct contact with the space dividing element 16a. In the assembled state the heating elements 12a are arranged on a side of the space dividing element 16a facing the base body 30a. In the assembled state the control unit 34a is arranged on a side of the space dividing element 16a facing away from the base body 30a. In the assembled state the space dividing element 16a is arranged between the heating elements 12a and the control unit 34a. The space dividing element 16a is embodied as a plate. In an operating status the space dividing element 16a shields the control unit 34a against electromagnetic radiation caused by the heating elements 12a. The space dividing element 16a is embodied as a shielding element. In the assembled state the heating elements 12a are fixed on the space dividing element 16a.

Figure 4:
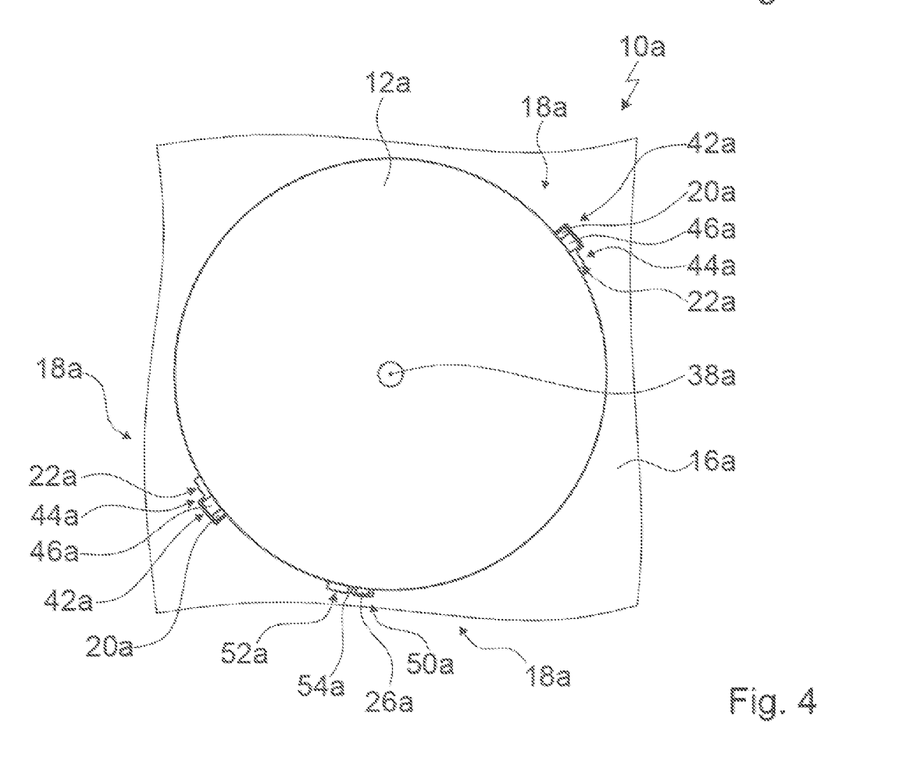
FIG. 4 shows a heating element from FIG. 3 in the unlocked state in a schematic representation.
Figure 7:
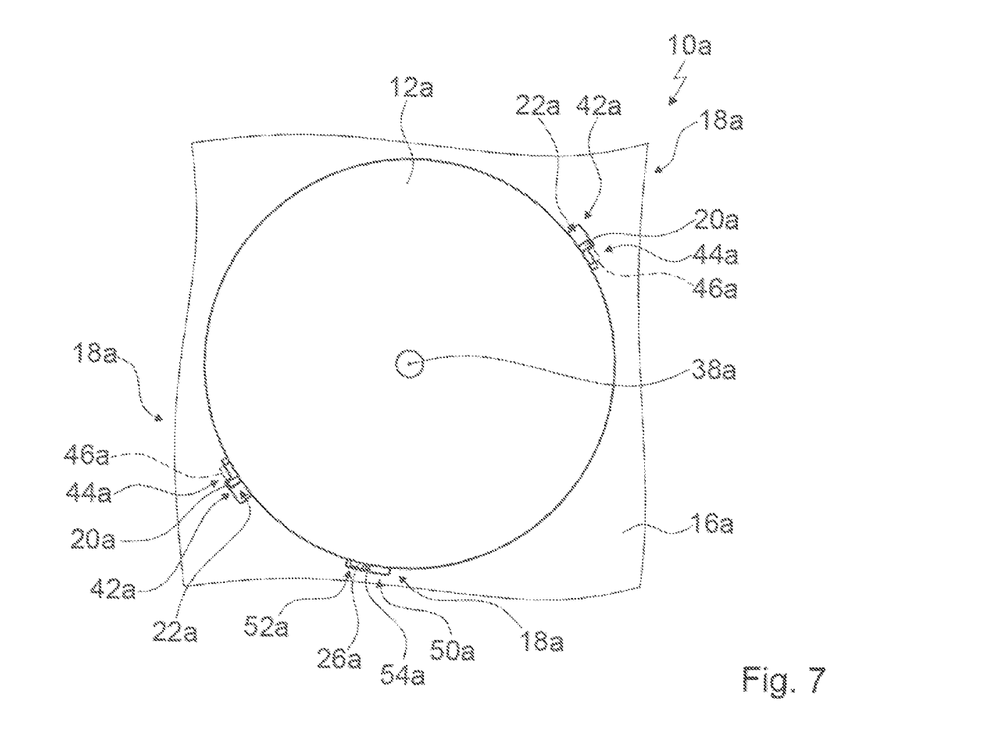
FIG. 7 shows the heating element from FIG. 3 in the locked state in a schematic representation.

The hob apparatus 10a comprises a fixing unit 18a, which attaches the heating elements 12a and the space dividing element 16a to each other. In the assembled state the fixing unit 18a attaches the heating elements 12a and the space dividing element 16a to each other in a manner permitting their release without the use of tools. The fixing unit 18a is in part embodied as a locking unit. The fixing unit 18a locks the heating elements 12a and the space dividing element 16a to each other. The fixing unit 18a attaches the heating elements 12a and the space dividing element 16a by means of rotational movements of the heating elements 12a and the space dividing element 16a relative to each other. The rotational movements are limited to an angular range of 10° (cf. FIGS. 4 and 7). The rotational movements take place in each case about an axis of rotation 38a. The axes of rotation 38a run in the assembled state through a center of the heating elements 12a. The axes of rotation 38a run essentially perpendicularly to one surface of the space dividing element 16a.

Figure 5:
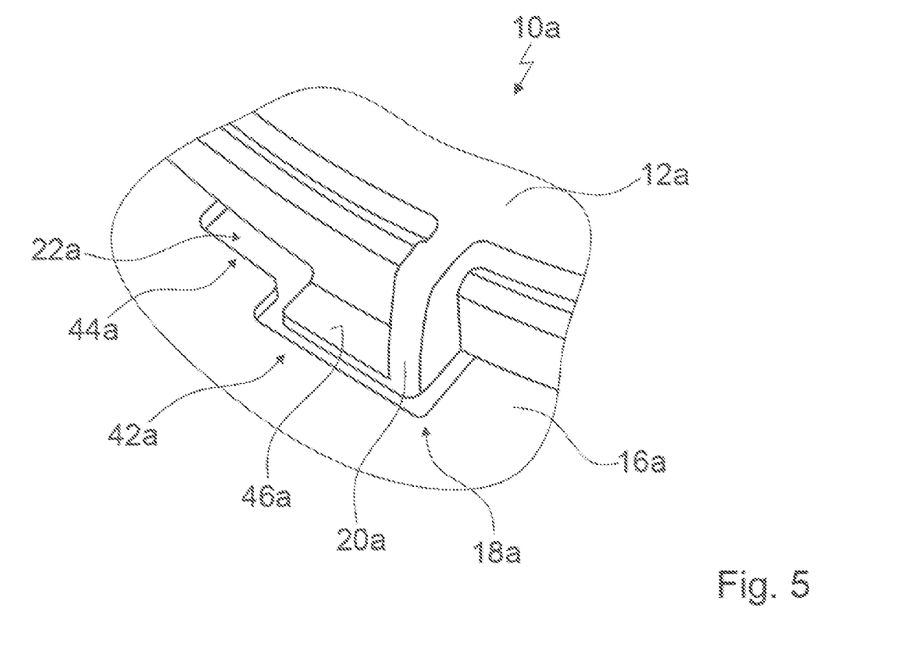
FIG. 5 shows an extract of the heating element from FIG. 4 in the unlocked state in a schematic representation.
Figure 8:
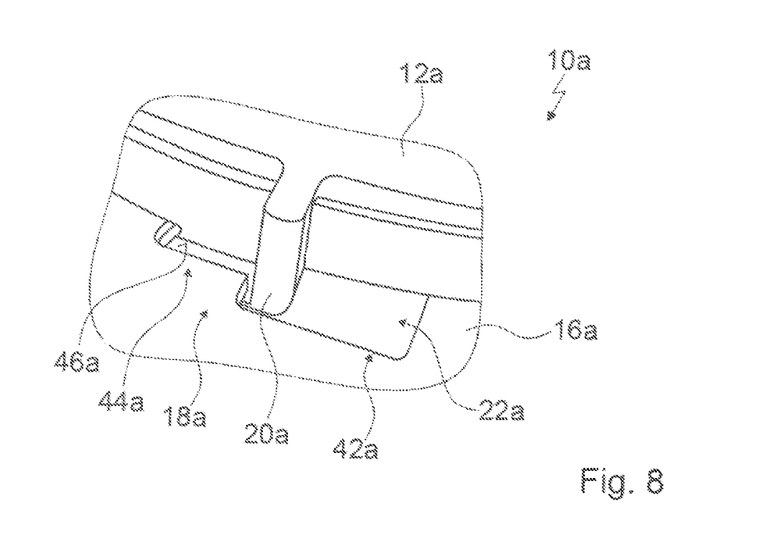
FIG. 8 shows an extract of the heating element from FIG. 7 in the locked state in a schematic representation.

The fixing unit 18a has eight fixing elements 20a, which are provided for attaching the heating elements 12a and the space dividing element 16a to each other (cf. FIGS. 3 and 5). Two of the fixing elements 20a are in each case arranged on one of the heating elements 12a. The fixing elements 20a are attached to the heating elements 12a. The fixing elements 20a are essentially embodied in one piece with the heating elements 12a. The fixing elements 20a are arranged on the heating elements 12a on two sides of the heating elements 12a lying radially opposite to each other. The fixing elements 20a project beyond the underside 36a of the heating elements 12a (cf. FIG. 3). In the locked state the fixing elements 20a penetrate space dividing element 16a in part (cf. FIG. 8). Each fixing element 20a has a fixing surface 46a, which in the assembled state is arranged in direct contact with a side of the space dividing element 16a facing away from the heating element 12a.

The space dividing element 16a has eight recesses 22a for accommodating the fixing elements 20a (cf. FIG. 2, of which however only two are visible here). The recesses 22a have two areas 42a, 44a with extensions differing in radial direction 40a. In a first of the areas 42a the recess 22a has a larger one of the extensions. The first area 42a serves to introduce the fixing elements 20a. In a second of the areas 44a the recess 22a has a smaller one of the extensions. In the locked state the fixing elements 20a are arranged in the second area 44a. In the locked state the fixing elements 20a reach under the space dividing element 16a in the second area 44a. In the locked state the fixing elements 20a are arranged in direct contact with the space dividing element 16a by means of the fixing surfaces 46a. In the locked state the fixing elements 20a create a form-fitted and non-positive connection between the heating elements 12a and the space dividing element 16a (cf. FIGS. 7 and 8). It is alternatively conceivable that the fixing elements 20a in the locked state only create a form-fitted connection between the heating elements 12a and the space dividing element 16a.

Each heating element 12a comprises a stabilization element 24a (cf. FIG. 3). The stabilization elements 24a are arranged on the heating elements 12a. The stabilization elements 24a are fixed on the heating elements 12a. The stabilization elements 24a are essentially embodied in one piece with the heating elements 12a. The stabilization elements 24a are arranged on the undersides 36a of the heating elements 12a. The stabilization elements 24a project beyond the underside 36a. The stabilization elements 24a are essentially embodied in cylindrical form. The stabilization elements 24a are essentially arranged underneath a center of the heating elements 12a. The axes of rotation 38a run through the stabilization elements 24a. The stabilization elements 24a are provided for stabilization of a fixing between the heating elements 12a and the space dividing element 16a. In the assembled state the stabilization elements 24a essentially penetrate the space dividing element 16a. The space dividing element 16a has four stabilization recesses 48a for accommodating the stabilization elements 24a (cf. FIG. 2, of which however only one is visible). In the assembled state the stabilization elements 24a are essentially arranged concentrically around axes of rotation 38a.

Figure 6:
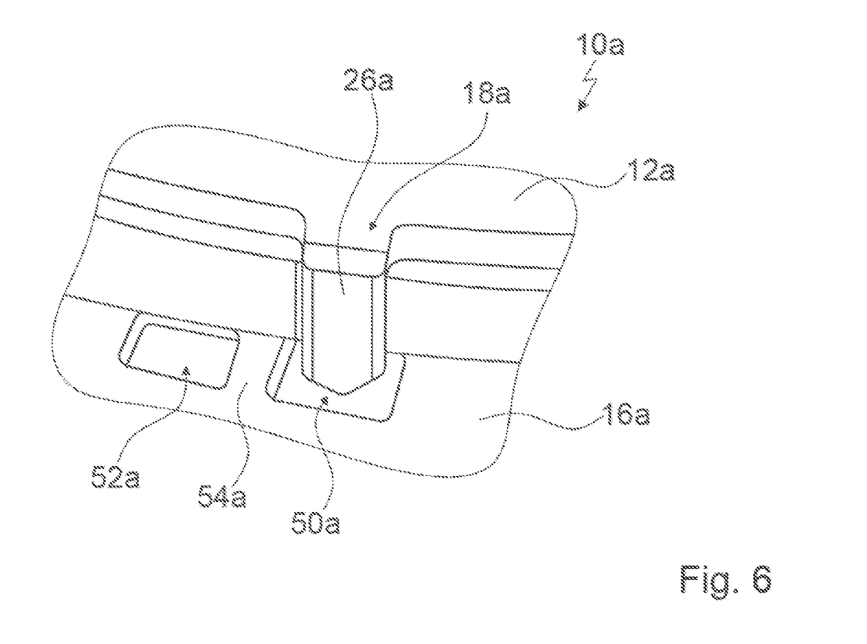
FIG. 6 shows a further extract of the heating element from FIG. 4 in the unlocked state in a schematic representation.
Figure 9:
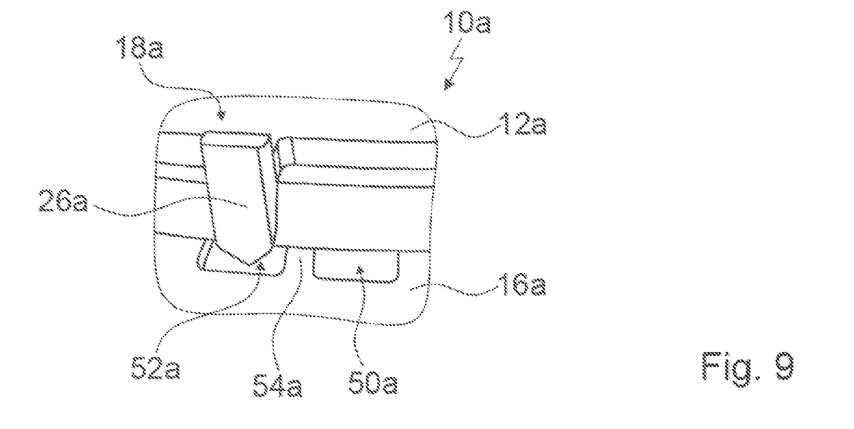
FIG. 9 shows a further extract of the heating element from FIG. 7 in the locked state in a schematic representation.

The fixing unit 18a has four protection elements 26a (cf. FIGS. 3, 6 and 9). The protection elements 26a are arranged on the heating elements 12a. The protection elements 26a are fixed on the heating elements 12a. A protection element 26a is in each case essentially embodied in one piece with a heating element 12a in each case. It is alternatively conceivable that the protection element is arranged on the space dividing element. The protection elements 26a project beyond the underside 36a of the heating elements 12a. In the assembled state the protection elements 26a secure a target position of the heating elements 12a and the space dividing element 16a relative to each other.

In the assembled state the protection elements 26a in part penetrate the space dividing element 16a. The space dividing element 16a has four first protection recesses 50a and four second protection recesses 52a for accommodating the protection elements 26a (cf. FIG. 2). A first protection recess 50a and a second protection recess 52a are in each case adjacently arranged. In an area of the adjacently arranged protection recesses 50a, 52a the space dividing element 16a forms a web 54a, which separates the first protection recess 50a and the second protection recess 52a from each other.

In a method for the assembly of the hob apparatus 10a, the heating elements 12a and the space dividing element 16a are locked to each other. In a first method step the heating elements 12a are positioned above the space dividing element 16a. It is here ensured that the fixing elements 20a are arranged in positions corresponding to the recesses 22a. The heating elements 12a are subsequently brought closer to the space dividing element 16, wherein the undersides 36a of the heating elements 12a are turned in the direction of the space dividing element 16a. The heating elements 12a are brought closer to the space dividing element 16a until the undersides 36a rest upon the space dividing element 16a. If the heating elements 12a lie upon the space dividing element 16a, the fixing elements 20a are arranged in the first areas 42a of the recesses 22a of the space dividing element 16a. The stabilization elements 24a are arranged in the stabilization recesses 48a. The protection elements 26a are arranged in the first protection recesses 50a (cf. FIG. 4 to 6). This state is designated as the unlocked state.

Starting from the unlocked state, the heating elements 12a are rotated about the axes of rotation 38a. The rotational movements take place over an angular range of essentially 10°. With the rotational movements the fixing elements 20a are moved from the first area 42a of the recess 22a into the second area 44a of the recess 22a. In the second area 44a the fixing surfaces 46a are arranged in direct contact with the side of the space dividing element 16a facing away from the heating elements 12a (cf. FIG. 7 to 9). In the locked state the fixing elements 20a reach under the space dividing element 16a. With the rotational movements the protection elements 26a are moved from the first protection recesses 50a into the second protection recesses 52a. The protection elements 26a are hereby moved across the web 54a. The web 54a prevents a return of the protection elements 26a into the first protection recesses 50a. This state is designated as the locked state. In the locked state a target position of the heating elements 12a and the space dividing element 16a relative to each other is achieved. The protection elements 26a prevent an undesired release from the target position.

FIGS. 10 to 14 show a further embodiment of the invention. The descriptions which follow are limited essentially to differences between the embodiments, wherein regarding components, features and functions which remain the same, reference can be made to the description of the exemplary embodiment of FIG. 1 to 10. For differentiation of the embodiment the letter 'a' in the reference characters of the exemplary embodiment in FIG. 1 to 9 is replaced by the letter 'b' in the reference characters of the exemplary embodiment of FIG. 10 to 14. With regard to similarly designated components, in particular with regard to components with the same reference characters, reference can basically be made to the drawings and/or the description of the exemplary embodiment of FIG. 1 to 9.

Figure 10:
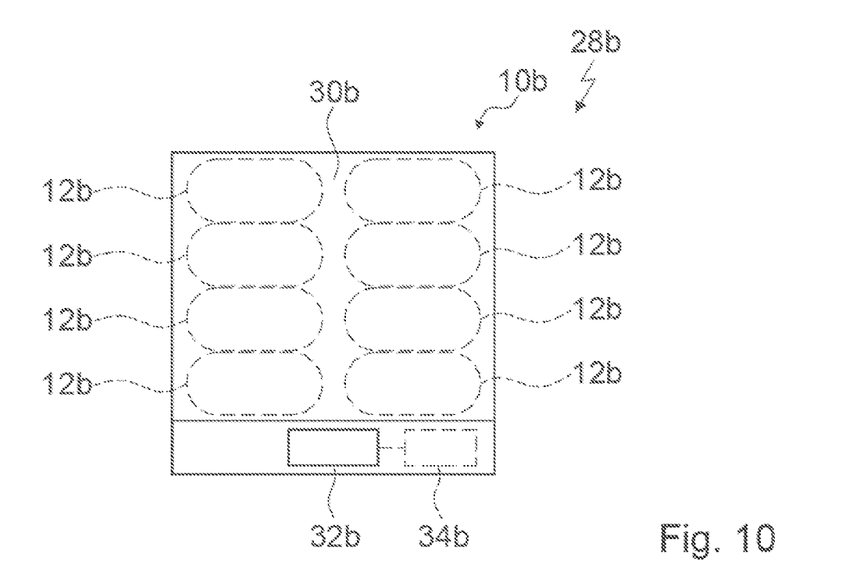
FIG. 10 shows a further embodiment of a hob with a further inventive hob apparatus in a schematic top view.

FIG. 10 shows an inventive hob 28b, which is embodied as an induction hob, with an inventive hob apparatus 10b, which is embodied as an induction hob apparatus. The hob apparatus 10b comprises eight heating elements 12b, which are provided for the heating of cooking vessels. The heating elements 12b are embodied as longitudinal heating elements 12b. The heating elements 12b have an essentially oval shape. The heating elements 12b have a longitudinal extension, which is larger than a transverse extension of the heating elements 12b.

The hob apparatus 10b comprises a space dividing element 16b embodied as a shielding element, which in an installation position is provided (cf. FIG. 11) to support the heating elements 12b. In the assembled state the heating elements 12b are fixed on the space dividing element 16b. The hob apparatus 10b comprises a fixing unit 18b, which attaches the heating elements 12b and the space dividing element 16b to each other. The fixing unit 18b is embodied in part as a locking unit. The fixing unit 18b attaches the heating elements 12b and the space dividing element 16b by means of rotational movements of the heating elements 12b and the space dividing element 16b relative to each other. The rotational movements are limited to an angular range of 5° (cf. FIG. 13 and 14). The rotational movements take place about axes of rotation 38b, which in the assembled state run through a center of the heating elements 12a.

The fixing unit 18b has sixteen fixing elements 20b, which are provided for attaching the heating elements 12b and the space dividing element 16b to each other (cf. FIGS. 3 and 5). Two of the fixing elements 20b are in each case arranged on one of the heating elements 12b. The fixing elements 20b are essentially embodied in one piece with the heating elements 12b. The fixing elements 20b project beyond an underside 36b of the heating elements 12b (cf. FIG. 12). In the locked state the fixing elements 20b penetrate the space dividing element 16b in part. Each fixing element 20b has a fixing surface 46b, which in the assembled state is arranged in direct contact with a side of the space dividing element 16b facing away from the heating element 12b.

Figure 11:
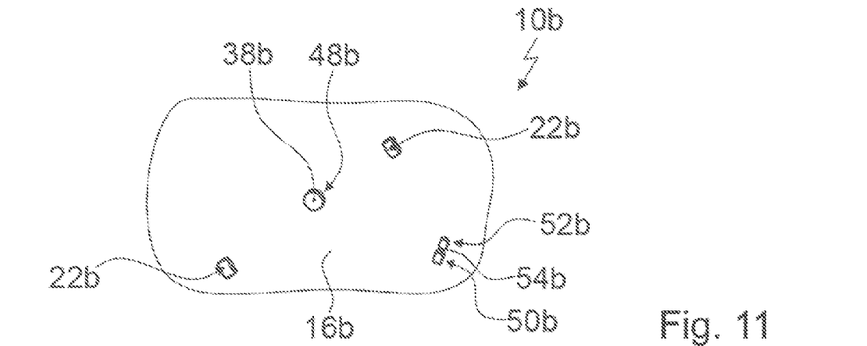
FIG. 11 shows a further extract of a space dividing element of the inventive hob apparatus from FIG. 1 in a schematic top view.

The space dividing element 16b has sixteen recesses 22b for accommodating the fixing elements 20b (cf. FIG. 11). The recesses 22b serve to bring the fixing elements 20b into the unlocked state. In the locked state the fixing elements 20b are arranged in part on a side of the space dividing element 16b facing away from the heating elements 12b. In the locked state the fixing elements 20b are arranged in direct contact with the space dividing element 16b by means of fixing surfaces 46b of the fixing elements 20b.

Each heating element 12b comprises a stabilization element 24b (cf. FIG. 12), which are essentially embodied in one piece with the heating elements 12a. In the assembled state the stabilization elements 24b essentially penetrate the space dividing element 16a. The space dividing element 16b has four stabilization recesses 48b for accommodating the stabilization elements 24b (cf. FIG. 11).

Figure 12:
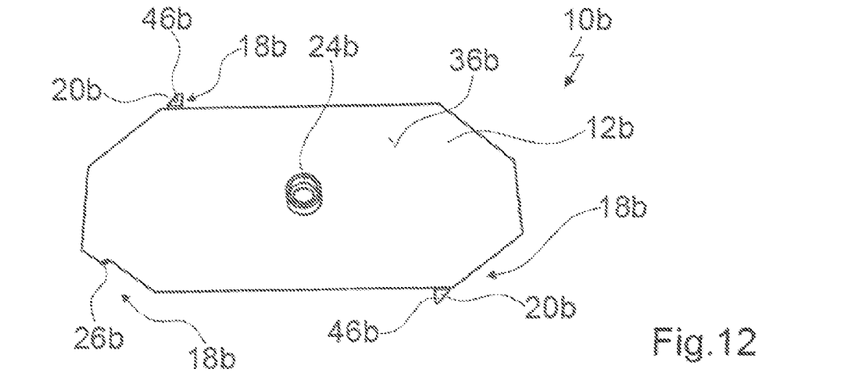
FIG. 12 shows a heating element of the inventive hob apparatus from FIG. 10 from an underside in a schematic representation.
Figure 13:
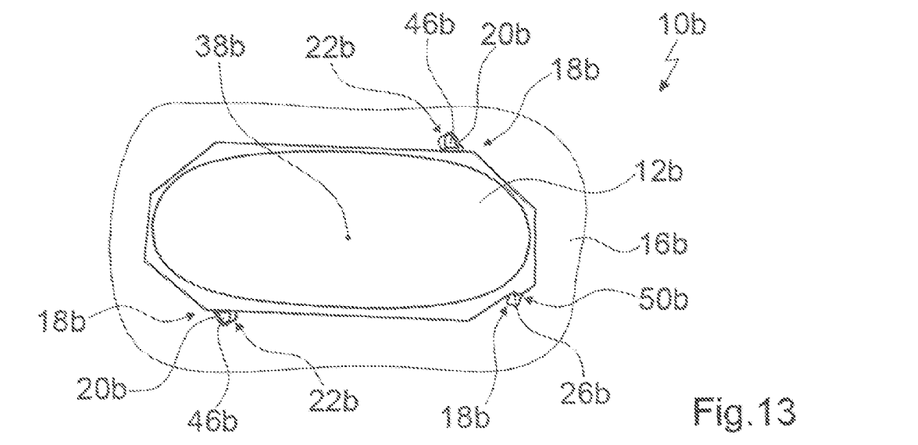
FIG. 13 shows the heating element from FIG. 11 in the unlocked state in a schematic representation and FIG. 14 shows the heating element from FIG. 11 in the locked state in a schematic representation.
Figure 14:
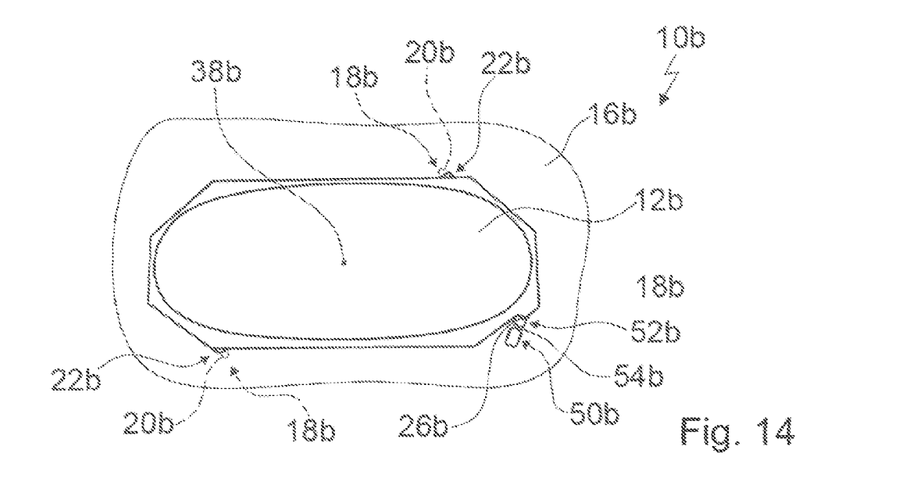

The fixing unit 18b has eight protection elements 26b (cf. FIG. 12 to 14). A protection element 26b is in each case essentially embodied in one piece with a heating element 12b in each case. In the assembled state the protection elements 26b secure a target position of the heating elements 12b and the space dividing element 16b relative to each other. In the assembled state the protection elements 26b in part penetrate the space dividing element 16b. The space dividing element 16b has eight first protection recesses 50b and eight second protection recesses 52b for accommodating the protection elements 26b (cf. FIG. 11). A first protection recess 50b and a second protection recess 52b are in each case adjacently arranged. The space dividing element 16b forms a web 54b in an area of the adjacently arranged protection recesses 50b, 52b, which separates the first protection recess 50b and the second protection recess 52b from each other.

In a method for the assembly of the hob apparatus 10b, the heating elements 12b and the space dividing element 16b are locked to each other. Starting from an unlocked state (cf. FIG. 13) the heating elements 12b are rotated about the axis of rotation 38b. The rotational movements take place over an angular range of essentially 5°. With the rotational movements the fixing elements 20b are moved in the recesses 22b, in order to be moved by means of the rotational movements in part out of the recesses 22b under the space dividing element 16. After rotational movements have taken place, the fixing elements 20b are in part, and specifically with the fixing surfaces 46b, arranged in direct contact with the side of the space dividing element 16b facing away from the heating elements 12b (cf. FIG. 14).

With the rotational movements the protection elements 26b are moved from the first protection recesses 50b into the second protection recesses 52b. The protection elements 26b are hereby moved across the web 54b. The web 54b prevents a return of the protection elements 26b into the first protection recesses 50b. The protection elements 26b prevent an undesired release from the target position.

The invention claimed is:

1. A hob apparatus, comprising:
   at least one heating element adapted to heat a cooking vessel;
   at least one space dividing element configured to support the at least one heating element in an installation position, and
   a fixing unit configured to attach the at least one heating element and the at least one space dividing element to each other, said fixing unit comprising two locking units on opposing sides of the heating element, the two locking units configured to be received by corresponding recesses in the at least one space dividing element,
   wherein the fixing unit is configured to attach the at least one heating element and the at least one space dividing element to each other as a result of a rotational movement of the at least one heating element and of the at least one space dividing element relative to each other.

2. The hob apparatus of claim 1, constructed in the form of an induction hob apparatus.

3. The hob apparatus of claim 1, wherein the rotational movement is limited to an angular range of maximum 30°.

4. The hob apparatus of claim 1, wherein the fixing unit has at least one fixing element which is arranged on the at least one heating element and penetrates the at least one space dividing element at least in part in a locked state.

5. The hob apparatus of claim 4, wherein the at least one fixing element is embodied at least essentially in one piece with the at least one heating element.

6. The hob apparatus of claim 4, wherein the at least one space dividing element has at least one recess for accommodating the at least one fixing element.

7. The hob apparatus of claim 1, wherein the at least one heating element comprises at least one stabilization element configured to stabilize a fixing between the at least one heating element and the at least one space dividing element.

8. The hob apparatus of claim 1, wherein the fixing unit has at least one protection element configured to secure a target position of the at least one heating element and of the at least one space dividing element relative to each other in an assembled state.

9. The hob apparatus of claim 1, wherein the at least one space dividing element is embodied as a shielding element.

10. A hob, comprising at least one hob apparatus, said hob apparatus comprising at least one heating element adapted to heat a cooking vessel, at least one space dividing element configured to support the at least one heating element in an installation position, and a fixing unit configured to attach the at least one heating element and the at least one space dividing element to each other, said fixing unit comprising two locking units on opposing sides of the heating element, the two locking units configured to be received by corresponding recesses in the at least one space dividing element, wherein the fixing unit is configured to attach the at least one heating element and the at least one space dividing element to each other as a result of a rotational movement of the at least one heating element and of the at least one space dividing element relative to each other.

11. The hob of claim 10, constructed in the form of an induction hob.

12. The hob of claim 10, wherein the rotational movement is limited to an angular range of maximum 30°.

13. The hob of claim 10, wherein the fixing unit has at least one fixing element which is arranged on the at least one heating element and penetrates the at least one space dividing element at least in part in a locked state.

14. The hob of claim 13, wherein the at least one fixing element is embodied at least essentially in one piece with the at least one heating element.

15. The hob of claim 13, wherein the at least one space dividing element has at least one recess for accommodating the at least one fixing element.

16. The hob of claim 10, wherein the at least one heating element comprises at least one stabilization element configured to stabilize a fixing between the at least one heating element and the at least one space dividing element.

17. The hob of claim 10, wherein the fixing unit has at least one protection element configured to secure a target position of the at least one heating element and of the at least one space dividing element relative to each other in an assembled state.

18. The hob of claim 10, wherein the at least one space dividing element is embodied as a shielding element.

19. A method for the assembly of a hob apparatus, comprising:
supporting at least one heating element for heating a cooking vessel by at least one space dividing element in an installation position; and
locking the at least one heating element and the at least one space dividing element to each other,
wherein the at least one heating element and the at least one space dividing element are locked to each other as a result of a rotational movement of the at least one heating element and of the at least one space dividing element relative to each other,
wherein the at least one heating element and the at least one space dividing element are locked to each other by fixing elements comprising two locking units on opposing sides of the heating element, the two locking units configured to be received by corresponding recesses in the at least one space dividing element.

20. The method of claim 19, wherein the rotational movement is limited to an angular range of maximum 30°.

21. The method of claim 19, wherein the fixing elements are arranged on the at least one heating element and penetrates the at least one space dividing element at least in part in a locked state.

22. The method of claim 21, further comprising forming the at least one fixing element at least essentially in one piece with the at least one heating element.

23. The method of claim 21, further comprising forming a recess in the at least one space dividing element for accommodating the at least one fixing element.

24. The method of claim 19, further comprising forming at least one stabilization element on the at least one heating element for stabilizing a fixing between the at least one heating element and the at least one space dividing element.

25. The method of claim 19, further comprising securing a target position of the at least one heating element and of the at least one space dividing element relative to each other in an assembled state.

* * * * *